(12) United States Patent
Themelis et al.

(10) Patent No.: US 10,962,759 B2
(45) Date of Patent: Mar. 30, 2021

(54) CONTROLLER FOR A MICROSCOPE, A CORRESPONDING METHOD AND A MICROSCOPE SYSTEM

(71) Applicant: Leica Instruments (Singapore) Pte. Ltd., Singapore (SG)

(72) Inventors: George Themelis, Lindau (DE); Tobias Wilken, St. Gallen (CH)

(73) Assignee: Leica Instruments (Singapore) Pte. Ltd., Singapore (SG)

(*) Notice: Subject to any disclaimer, the term of this patent is extended or adjusted under 35 U.S.C. 154(b) by 0 days.

(21) Appl. No.: 16/785,729

(22) Filed: Feb. 10, 2020

(65) Prior Publication Data

US 2020/0257104 A1    Aug. 13, 2020

(30) Foreign Application Priority Data

Feb. 12, 2019    (EP) .................................... 19156648

(51) Int. Cl.
| | | |
|---|---|---|
| *H04N 13/204* | (2018.01) | |
| *G02B 21/36* | (2006.01) | |
| *G06T 7/62* | (2017.01) | |
| *G06T 7/70* | (2017.01) | |

(Continued)

(52) U.S. Cl.
CPC ....... *G02B 21/365* (2013.01); *G02B 21/0012* (2013.01); *G06T 7/62* (2017.01); *G06T 7/70* (2017.01); *G06T 17/00* (2013.01); *H04N 13/204* (2018.05); *G06T 2207/10012* (2013.01); *G06T 2207/10028* (2013.01);

(Continued)

(58) Field of Classification Search
CPC ................ H04N 13/204; G02B 21/365; G02B 21/0012; G06T 7/62; G06T 7/70; G06T 17/00; G06T 2207/10012; G06T 2207/2207; G06T 2207/10028; G06T 2207/10056; G06T 2207/30004; G06T 2210/41
USPC ............................................................ 348/46
See application file for complete search history.

(56) References Cited

U.S. PATENT DOCUMENTS

| 4,621,283 A * | 11/1986 | Feinbloom ............... F21L 15/14 348/376 |
| 4,922,338 A * | 5/1990 | Arpino ................... G01N 21/88 348/125 |

(Continued)

FOREIGN PATENT DOCUMENTS

WO    2018076094 A1    5/2018

OTHER PUBLICATIONS

Treuillet, S.Ylvieet al., "Three-Dimensional Assessment of Skin Wounds Using a Standard Digital Camera," IEEE Transactions on Medical Imaging, Piscataway NJ, US, vol. 28, No. 5, pp. 752-762 (May 2, 2009).

(Continued)

*Primary Examiner* — Michael Lee
(74) *Attorney, Agent, or Firm* — 2SPL Patent Attorneys PartG mbB; Kieran O'Leary

(57) ABSTRACT

A controller for a microscope is configured to receive image data representing a wound and to determine a line of sight to a bottom of the wound using the image data. The controller is further configured to output a control signal for the microscope, the control signal instructing the microscope to align its optical axis with the line of sight.

13 Claims, 2 Drawing Sheets

(51) Int. Cl.
*G02B 21/00* (2006.01)
*G06T 17/00* (2006.01)

(52) U.S. Cl.
CPC .............. *G06T 2207/10056* (2013.01); *G06T 2207/30004* (2013.01); *G06T 2210/41* (2013.01)

(56) References Cited

U.S. PATENT DOCUMENTS

| | | | | |
|---|---|---|---|---|
| 4,964,708 | A * | 10/1990 | Mason | G02B 21/20 359/380 |
| 2007/0216998 | A1* | 9/2007 | Sander | A61B 90/36 359/363 |
| 2007/0239005 | A1* | 10/2007 | Ogasawara | A61B 8/14 600/437 |
| 2008/0013809 | A1* | 1/2008 | Zhu | G06F 19/321 382/128 |
| 2009/0326556 | A1 | 12/2009 | Diolaiti et al. | |
| 2012/0320186 | A1* | 12/2012 | Urban | A61B 1/00149 348/79 |
| 2013/0038835 | A1* | 2/2013 | Kitajima | A61B 3/1035 351/206 |
| 2018/0177523 | A1 | 6/2018 | Piron et al. | |
| 2018/0214071 | A1 | 8/2018 | Fright et al. | |
| 2020/0197101 | A1* | 6/2020 | Stopp | G06T 7/292 |

OTHER PUBLICATIONS

Filko, Damir et al., "Wound measuremet by RGB-D Camera," Machine Vision and Applications, Springer-Verlag, DE, vol. 29, No. 4, pp. 633-654 (Mar. 30, 2018).

* cited by examiner

CONTROLLER FOR A MICROSCOPE, A CORRESPONDING METHOD AND A MICROSCOPE SYSTEM

CROSS-REFERENCE TO RELATED APPLICATION

This application claims priority to European Application 19156648, filed on Feb. 12, 2019. The contents of the earlier filed application is incorporated by reference herein in its entirety.

TECHNICAL FIELD

Embodiments relate to controllers for a microscope and to associated methods and computer programs to control a microscope.

BACKGROUND

Surgeons may require a microscope in order to perform a surgery at the bottom of deep wounds, i.e. for wounds that form a deep cavity within human tissue. For example, in brain surgeries the wound is typically deep in order to be able to access the tissue within the brain that is to be operated on. The tissue to be operated on is typically at the bottom of the cavity and a microscope is used to enable the surgeon to monitor the tools used at the bottom of the cavity.

SUMMARY

An embodiment relates to a controller for a microscope such as a surgical microscope. The controller is configured to receive image data representing a wound and to determine a line of sight towards a bottom of the wound using the image data. Further, the controller is configured to output a control signal for the microscope, the control signal instructing the microscope to align its optical axis with the line of sight. Using such a controller for a microscope may enable an automatic adjustment of the microscope's orientation such that the tissue to be operated on is visible for the surgeon while avoiding a manual adjustment by the surgeon which may be slower than automated adjustment. A surgeon may so save time to a patient's benefit. Further, a surgeon may only need to concentrate on the surgery itself without any interruption to adjust the microscope, which may result in a better result of the surgery.

According to an embodiment, the image data comprises multiple images of the wound taken along different directions and the controller is configured to calculate an area of the wound within each image. Further, the controller is configured to determine the line of sight based on the direction corresponding to the image having the wound with the greatest area. The select image showing the wound with the greatest area amongst all images is taken under an angle closest to the direction perpendicular to the patient's tissue. A line of sight corresponding to the select image may serve to view the bottom of the wound while the line of sight may be determined using only the imaging equipment of the microscope itself.

According to an embodiment, the controller is configured to determine a three-dimensional model of a cavity of the wound based on the image data. A three-dimensional model may allow to determine the line of sight using arbitrary criteria to perform the alignment with a very high flexibility and the possibility to adapt the determination of the line of sight to the individual surgery or to the preferences of an individual surgeon.

According to an embodiment, the controller is configured to determine the line of sight based on an axis within the cavity that fulfills a predetermined criterion. Providing the possibility to define a predetermined criterion may provide the flexibility to adapt the determination of the line of sight to the individual surgery.

According to an embodiment, the controller is configured to determine the line of sight based on a cavity centroid axis of the cavity. Using the cavity centroid axis may determine the line of sight such that an average distance to the surrounding walls of the cavity along the line of sight is maximized. This may provide a line of sight with maximum safety margins in the event that the flexible sidewalls of the cavity of the wound move or deform during the course of the surgery.

According to an embodiment, the controller is configured to determine the line of sight based on an axis that maximizes the visible area of a bottom of the cavity. Maximizing the visible area of the bottom of the cavity may enable the surgeon to easily navigate at the bottom of the wound.

According to an embodiment, the controller is configured to determine a further line of sight to the bottom of the wound based on further image data generated using the line of sight. If the controller is enabled to update the line of sight and the alignment of the microscope by determining a further line of sight, the alignment may be continuously re-adjusted during the ongoing surgery to enable the surgeon to concentrate only on the surgery itself, which may, on the one hand, decrease the time for the surgery and, the other hand, increase the quality of the result.

An embodiment of a microscope system comprises a controller and a microscope configured to align its optical axis with the line of sight based on the control signal. An embodiment of a microscope system may avoid manual adjustment of the microscope by the surgeon which may be slower and less reliable than an automated adjustment. A surgeon may so only need to concentrate on the surgery itself, which may result in a better result of the surgery.

According to an embodiment, the microscope system further comprises an imaging device configured to generate the image data. A microscope system according to such an embodiment may be used to autonomously determine the required image data and adjust the field of view of the microscope.

According to an embodiment, the imaging device is one of a time-of-flight camera, a stereo camera, and a three-dimensional camera. Equipping a microscope system with such an imaging device may enable the controller to determine a three-dimensional model of a cavity of the wound based on image data generated by means of the microscope system itself.

An embodiment of a method for controlling a microscope comprises receiving image data representing a wound and determining a line of sight to a bottom of the wound using the image data. The method further comprises instructing a microscope to align its optical axis with the line of sight.

According to an embodiment of the method, determining the line of sight comprises calculating an area of the wound within each image of multiple images of the wound taken along different directions and determining the line of sight based on the direction corresponding to the image having the wound with the greatest area.

According to an embodiment of the method, the method comprises determining a three-dimensional model of a cavity of the wound based on the image data.

According to an embodiment of the method, the line of sight is determined based on a cavity centroid axis of the cavity.

According to an embodiment of the method, the line of sight is determined based on an axis that maximizes the visible area of a bottom of the cavity.

An embodiment of a computer program has a program code for performing a method for controlling a microscope when the program is executed on processor. An embodiment of the computer program may so be used to supplement or upgrade an existing microscope system with the capability of automatically align an optical axis of the microscope to a desirable line of sight.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
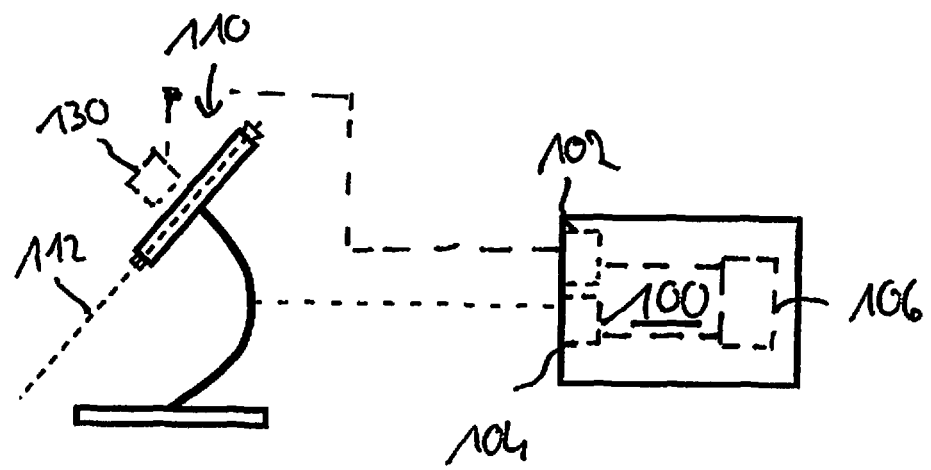
FIG. 1 illustrates an embodiment of a controller for a microscope.

FIG. 1 illustrates an embodiment of a controller 100 for a microscope 110 such as a surgical microscope 110. Microscope 110 having an optical axis 112 is illustrated in FIG. 1 to supplement the description of the controller. A controller 100 and a microscope 110 together constitute an embodiment of a microscope system. In FIG. 1, optional components are illustrated by dashed lines.

The controller 100 is configured to receive image data representing a wound and to determine a line of sight to a bottom of the wound using the image data. Further, the controller 100 is configured to output a control signal for the microscope 110, the control signal instructing the microscope 110 to align its optical axis 112 with the line of sight. Using such a controller 100 for a microscope 110 may enable an automatic adjustment of the microscope's orientation such that the tissue to be operated on is visible for the surgeon while avoiding a manual adjustment by the surgeon which may be slower than automated adjustment. A surgeon may so save time to a patient's benefit. Further, a surgeon may only need to concentrate on the surgery itself without any interruption to adjust the microscope, which may result in a better result of the surgery. Aligning the optical axis 112 of the microscope with a line of sight may, for example, be performed such that the optical axis 112 is parallel to the line of sight or that it is equal to the line of sight.

Aligning the optical axis 112 of the microscope may comprise changing the orientation of the microscope 110 or moving the microscope. Embodiments of controllers may be used with different types of microscopes. For example, microscopes may be used together with the controller 100 which already comprise motorized adjustments for its orientation. The orientation may, for example, be changed by means of a robotic, or generally a motorized arm of the (surgical) microscope 110. In the event of such a microscope, the control signal generated by the controller 100 may instruct the already present motors within the microscope 110 to result in an aligned optical axis 112 of the microscope 110. However, further embodiments of controllers may also be used as an add on to existing microscopes which are only partially motorized, or which are not motorized at all. In this event, motors can be added, for example to the mechanics adjusting the field of view of the microscope. In such a setup, the control signal of the controller instructs the added motors to perform the actions required to adjust the zoom and/or the orientation of the mechanics of the microscope.

In order to receive the image data, the controller 100 may furthermore optionally comprise an input interface 102. For outputting the control signal to the microscope 110, the controller 100 may optionally comprise an output interface 104. Depending on the circumstances and the capabilities of the microscope 110, the image data may be generated by and received from the microscope 110 or by external imaging means connected to the input interface 102. Any interconnect between the microscope 110 and the controller 100 maybe wired or wireless, the interconnect may establish a point-to-point connection, or it may be routed through an intermediate network, established over a bus system, or the like. In some embodiments, the controller 100 may furthermore optionally comprise a processor 106 to perform the calculations required to determine the line if sight using the image data.

Figure 2:
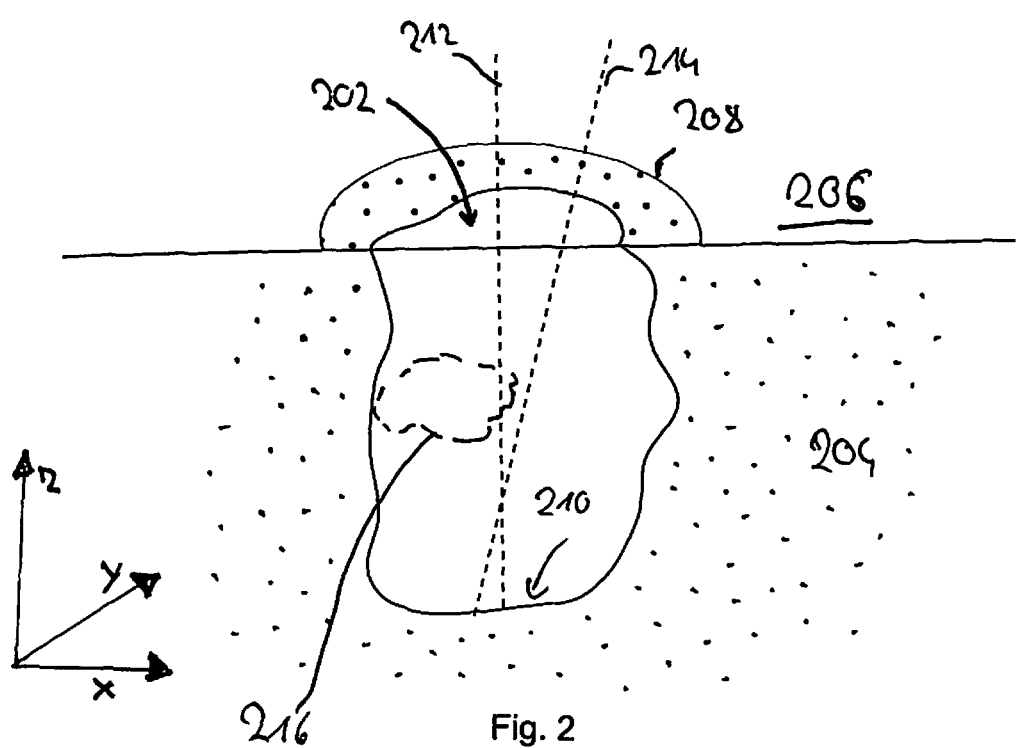
FIG. 2 illustrates a schematic view of a wound forming a deep cavity.

In order to discuss different possibilities to identify a line of sight, FIG. 2 schematically illustrates a profile of a wound 202 forming a deep cavity in human tissue 204. The wound 202 has an irregular shape and extends into the human tissue 204 to form a cavity therein. A deep wound may be characterized in that its extension at the surface of the wound is smaller than the depth of the cavity. In the exemplary coordinate system illustrated in FIG. 2, the surface of the wound 202 is essentially parallel to the x-y plane, while the cavity extends parallel to the z-direction. FIG. 2 illustrates a typical example for a surgery, where the wound 202 and the surrounding tissue 204 is covered by a sheet 206 which may, for example, be made of green or blue cloth. The sheet 206 and its circular opening 208 define the area directly accessible by the surgeon. When deep wounds are required, the surgery is often performed at a bottom 210 of the wound. In this event it may be required that the microscope 110 aligns its optical axis 112 to a line of sight that enables the surgeon to see the bottom 210 of the wound 202. Just as an example, FIG. 2 illustrates two possible lines of sight 212 and 214 that enable a view on the bottom 210 of the wound 202. The two lines of sight may, however, be determined using different criteria.

Line of sight 212 is approximately perpendicular to the surface of the wound 200 and extends approximately along the z-direction. Line of sight 212 may, for example, be generated using multiple images of the wound 202 taken along different directions. The multiple images may be taken by means of an image sensor of the microscope 110 or, alternatively or additionally by a further imaging device added to the microscope 110. FIG. 1 schematically illustrates an optional imaging device 130, which may be used for this purpose. In order to determine the line of sight 212, the controller is configured to calculate an area of the wound 202 within each of the images. In every image, the calculated area of the wound 202 corresponds to a projection of the real area of the wound onto a plane which is perpendicular to the direction from which the image has been taken. If the direction under which the image is taken is perpendicular to the surface of the wound 202, the calculated area of the wound 202 becomes maximum. Therefore, the corresponding direction may be used as a line of sight 212 to which the optical axis can be aligned to guarantee a view on the bottom 210 of the wound 202. The line of sight 212 may so be determined using only the imaging equipment of the microscope itself.

To calculate the area of the wound 202 within the individual images, the position of the wound is identified within the image data. There are multiple possible ways to identify a wound within various types of image data. Multiple possibilities to identify a wound within different type of image data are described in European patent application titled "A controller for a microscope, a corresponding method and a microscope system" and filed with the European patent office by the applicant on Feb. 12, 2019, receiving application number EP19156627. The teaching as to how a wound within image data can identified, for example by means of a controller, as well as the teaching regarding the image data that can be used is herewith incorporated herein by reference to said application.

The controller 100 may additionally or alternatively also be configured to determine a three-dimensional (3D) model of the cavity of the wound 202 based on the image data. A three-dimensional model may allow to determine a line of sight using arbitrary criteria to perform the alignment with high flexibility and the possibility to adapt the determination of the line of sight to the individual surgery or to the preferences of an individual surgeon. In other words, a 3-D model may provide for the possibility to determine the line of sight based on an axis within the cavity that fulfills an arbitrary predetermined criterion.

For example, the controller may be configured to determine the line of sight based on an axis that maximizes the visible area of a bottom of the cavity. Maximizing the visible area of the bottom 210 of the cavity may enable the surgeon to easily navigate within the wound. Maximization may be performed using an arbitrary search algorithm. Determining the line of sight based on the criterion that the visible area of a bottom 210 of the cavity is maximum may also serve to avoid obstacles, such as for example obstacle 216 schematically illustrated by dashed lines in FIG. 2. In the event that obstacle 216 is present, be it as part of tissue or by incorporation of external matter into the wound (for example cotton batting to absorb blood), determining the line of sight such that the visible area at the bottom 210 of the wound 202 is maximum will result in the bottom being still visible, although the obstacle 216 may block other possible lines of sight to the bottom 210 of the wound, such as for example line of sight 212.

The controller may also be configured to determine the line of sight based on a cavity centroid axis of the cavity. Using the cavity centroid axis may determine the line of sight such that an average distance to the surrounding walls of the cavity along the line of sight is maximized. This may provide a line of sight with maximum safety margins in the event that the flexible sidewalls of the cavity of the wound 202 move or deform during the course of the surgery. The cavity centroid axis may be computed like a principal axis of inertia for a body having a mass. To this end, the volume of the cavity may be viewed as a volume with uniform mass density to compute the principal axes of inertia solving the corresponding well-established equations. The principal axis of inertia extending in the z-direction may then be used as the line of sight, for example.

After having determined a first line of sight, the controller may also be configured to determine a further line of sight to the bottom of the wound based on further image data generated using the line of sight. If the controller is enabled to update the line of sight and the alignment of the microscope by determining a further line of sight, the alignment may be continuously re-adjusted during the ongoing surgery to enable the surgeon to concentrate only on the surgery itself, which may, on the one hand, decrease the time for the surgery and, the other hand, increase the quality of the result. Further, obstacles 216 entering the wound may not permanently block a surgeon's view on the bottom of the wound since a re-determined further line of sight may be chosen such that the obstacle 216 will not block the view on the bottom along the further line of sight.

As illustrated as an optional feature in FIG. 1, some embodiments of a microscope system, which comprises a microscope 110 and a controller 100, may optionally further be equipped with an imaging device 130 configured to generate the image data.

For example, some embodiments are equipped with a time-of-flight camera, a stereo camera, or a 3-D camera in order to enable the controller to generate a 3-D model of the cavity based on the image data generated by the imaging device chosen.

Figure 3:
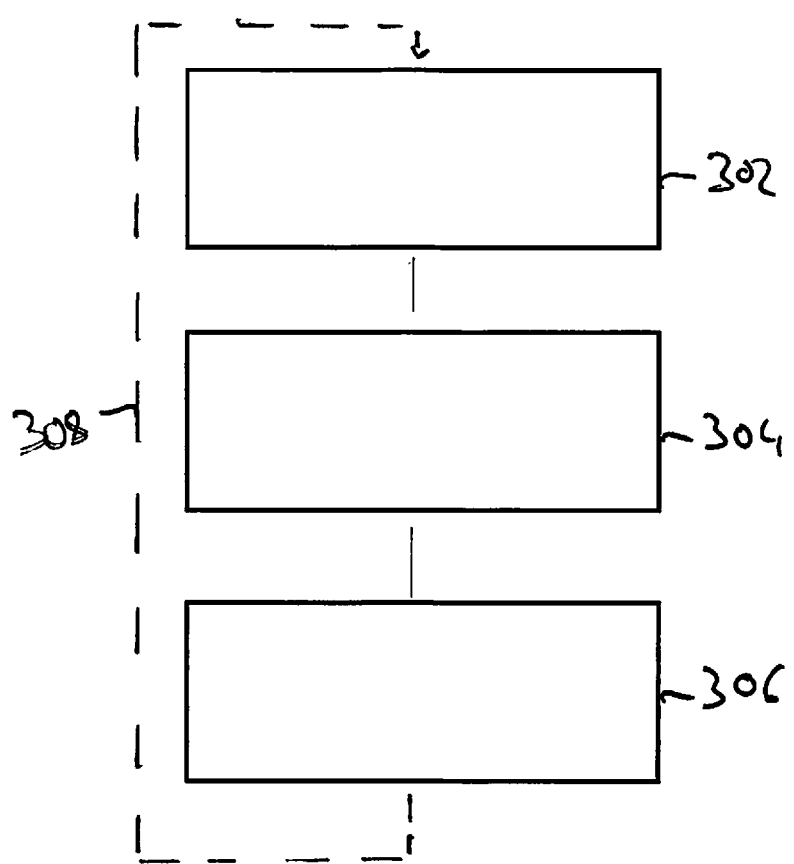
FIG. 3 illustrates a flowchart of an embodiment of a method for controlling a microscope.

FIG. 3 illustrates a flowchart of an embodiment of a method for controlling a microscope.

The method comprises receiving image data 302 representing a wound and determining a line of sight 304 to a bottom of the wound using the image data. Further, the method comprises instructing a microscope 306 to align its optical axis with the line of sight.

As further illustrated in FIG. 3, receiving image data 302, determining a line of sight 304 and instructing a microscope 306 to align its optical axis with the line of sight may optionally be performed in a loop 308 according to some embodiments. Continuously re-aligning the optical axis of a microscope may automatically consider obstacles within the cavity of a wound, such as for example tools used during the surgery. A permanent re-alignment may enable the surgeon to concentrate on the surgery and to avoid situations where the surgeon is no longer able to see the tissue he is operating on.

In other words, some previously described embodiments propose an alignment of a microscope in order to visualize the bottom of a narrow surgical cavity, which is a process which can be tedious and time consuming. For example, one may mimic the alignment as it would be done by humans, i.e. perceive the long axis of the cavity and align accordingly. There are different technical approaches. One may, for example, use the 2D camera of the microscope, and via image processing determine the rim of the surgical cavity. One may then change the imaging angle and calculate for each angle the area included in the rim. The vertical position is when the area is maximized. Artificial Intelligence could help to further improve this approach. For example, one may perform a 3D scan of the surgical cavity, and then calculate the optimal imaging axis as the geometrical axis of the cavity space. 3D scanning could be performed with different ways such as: stereo camera, 3D camera (e.g. time of flight (TOF), pattern projection), or scanning of working distance and use contract mapping.

As opposed to conventional approaches, where a dedicated set of tools (e.g. a tubular retractor with attached 3D-position star) is used to provide guidance to a robotic arm which automatically performs alignment, the embodiments described before may achieve the same result or a better result without the use of special retractors and/or other 3D-position tools/markers.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

LIST OF REFERENCE SIGNS 100 controller
102 input interface
104 output interface
106 processor
110 microscope
112 optical axis 130 imaging device
202 wound
204 tissue
206 cloth
208 opening
210 bottom of the wound
212 line of sight
214 further line of sight
216 obstacle
302 receiving image data representing tissue
304 determining a line of sight
306 instructing a microscope to align its optical axis
308 loop

What is claimed is:

1. A controller for a microscope, the controller being configured to:
receive image data representing a wound, wherein the image data comprises multiple images of the wound taken along different directions;
calculate an area of the wound within each image;
determine a line of sight towards to a bottom of the wound, wherein the line of sight is based on the direction corresponding to the image having the wound with the greatest area; and
output a control signal for the microscope, the control signal instructing the microscope to align its optical axis with the line of sight.

2. The controller of claim 1, wherein the controller is configured to determine a 3-dimensional model of a cavity of the wound based on the image data.

3. The controller of claim 2, wherein the controller is configured to determine the line of sight based on an axis within the cavity that fulfills a predetermined criterion.

4. The controller of claim 3, wherein the controller is configured to determine the line of sight based on a cavity centroid axis of the cavity.

5. The controller of claim 3, wherein the controller is configured to determine the line of sight based on an axis that maximizes the visible area of a bottom of the cavity.

6. The controller of claim 1, wherein the controller is configured to determine a further line of sight to the bottom of the wound based on further image data generated using the line of sight.

7. A microscope system, comprising:
a controller according to claim 1, and
a microscope configured to align its optical axis with the line of sight based on the control signal.

8. The microscope system of claim 7, further comprising: an imaging device configured to generate the image data.

9. The microscope system of claim 8, wherein the imaging device is one of a time-of-flight camera, a stereo camera, and a 3-dimensional camera.

10. A method for controlling a microscope, comprising:
receiving image data representing a wound, wherein the image data comprises multiple images of the wound taken along different directions;
calculating an area of the wound within each image;
determining a line of sight to a bottom of the wound, wherein the line of sight is based on the direction corresponding to the image having the wound with the greatest area; and
instructing a microscope to align its optical axis with the line of sight.

11. The method of claim 10, further comprising:
determining a three-dimensional model of a cavity of the wound based on the image data.

12. The method of claim 11, comprising:
determining the line of sight based on a cavity centroid axis of the cavity or based on an axis that maximizes the visible area of a bottom of the cavity.

13. A non-transitory, computer-readable medium having a program code for performing a method according to claim 10 when the program code is run on a processor.

* * * * *